US012789343B2

(12) United States Patent
Steenwyk et al.

(10) Patent No.: US 12,789,343 B2
(45) Date of Patent: Nov. 10, 2026

(54) BOOM COUPLER

(71) Applicant: Techtronic Cordless GP, Anderson, SC (US)

(72) Inventors: Brett Steenwyk, Greenville, SC (US); Ron Hoffman, Cairo, GA (US); Scott Reed, Anderson, SC (US)

(73) Assignee: TECHTRONIC CORDLESS GP, Anderson, SC (US)

(*) Notice: Subject to any disclaimer, the term of this patent is extended or adjusted under 35 U.S.C. 154(b) by 240 days.

(21) Appl. No.: 18/443,749

(22) Filed: Feb. 16, 2024

(65) Prior Publication Data

US 2024/0278406 A1 Aug. 22, 2024

Related U.S. Application Data

(60) Provisional application No. 63/446,592, filed on Feb. 17, 2023.

(51) Int. Cl.
*B25F 5/02* (2006.01)
*B25F 1/04* (2006.01)
*B25G 3/18* (2006.01)

(52) U.S. Cl.
CPC ................ *B25F 1/04* (2013.01); *B25F 5/024* (2013.01); *B25G 3/18* (2013.01)

(58) Field of Classification Search
CPC ..... B25F 1/02; B25F 1/04; B25F 5/02; B25G 1/04; B25G 1/06; B25G 1/10; B25G 3/00; B25G 3/02; B25G 3/04; B25G 3/06; B25G 3/12; B25G 3/18; B25G 3/24; B25G 3/36; B25G 3/38; F16B 7/00; F16B 7/04;
(Continued)

(56) References Cited

U.S. PATENT DOCUMENTS 4,829,675 A * 5/1989 Beihoffer ............. A01D 34/822 403/311
10,779,468 B2 * 9/2020 Ota ...................... A01D 34/902
(Continued)

FOREIGN PATENT DOCUMENTS

CN 201580496 U 9/2010
CN 203864891 U 10/2014
EP 3815504 A1 5/2021

OTHER PUBLICATIONS

European Search Report Corresponding to Application No. 24158001 on Aug. 22, 2024.

(Continued)

*Primary Examiner* — Robert J Scruggs
(74) *Attorney, Agent, or Firm* — Dority & Manning, P.A.

(57) ABSTRACT

A tool including a housing; a working head; and an elongated member extending between and coupling together the housing and the working head, wherein the elongated member includes: a first elongated member coupled to the housing, the first elongated member including one of a latch or engagement surface; and a second elongated member coupled to the working head, the second elongated member including the other of the latch or engagement surface, wherein the first and second elongated members are pivotally coupled together about a pivot axis, and wherein the latch is configured to selectively interface with the engagement surface to lock the first and second elongated members in an in-use configuration.

20 Claims, 6 Drawing Sheets

(58) Field of Classification Search
CPC ...... F16B 7/0426; F16B 7/0446; F16C 11/00; F16C 11/04; F16C 11/10; F16C 11/103
See application file for complete search history.

(56) References Cited

U.S. PATENT DOCUMENTS

| | | | | |
|---|---|---|---|---|
| 11,369,057 | B2 * | 6/2022 | Palermo | A01D 34/416 |
| 2008/0092398 | A1 * | 4/2008 | Hurley | A01D 34/905<br>30/276 |
| 2019/0254411 | A1 * | 8/2019 | Staniszewski | B25G 1/04 |

OTHER PUBLICATIONS

McMaster-Carr, "Weather-Resistant Draw Latch", https://www.mcmaster.com/1070A91/, Retrieved on Feb. 8, 2024, 1 page.

* cited by examiner

BOOM COUPLER

CROSS-REFERENCE TO RELATED APPLICATIONS

The present application claims priority to U.S. Provisional Patent Application Ser. No. 63/446,592 filed on Feb. 17, 2023, the disclosure of which is incorporated by reference herein in its entirety.

FIELD

The present invention relates to boom couplers and more particularly to tools having boom couplers which allow for storage and shipping in a compact manner.

BACKGROUND

Power tools such as, e.g., string trimmers and pole hedge trimmers utilize elongated members which extend between first and second sections of the power tool. For instance, the first section of a string trimmer may include a main housing which supports one or more removable batteries, user interfaces for controlling the string trimmer, and control circuitry. The second section of the string trimmer may include a working head including a cutting head which rotatably drives a cutting line. The main housing and cutting head are often spaced apart from one another and coupled together through an elongated member, such as a boom. Due to the size and shape of the string trimmer, the elongated member is typically long, e.g., in excess of 3 feet, and does not easily store or ship in a compact manner.

Other tools, such as pole loppers and elongated members supporting tooling at an end thereof, are often over 5 feet long to allow an operator to extend the tool over a distance to reach a work object, such as an elevated limb to be cut, a tall bush to be trimmed, a gutter to be cleaned, or the like. These elongated members may also be referred to as booms Similar to the above-described power tools, the nature of these elongated members do not allow for easy storage or shipping in a compact manner.

Accordingly, improved boom couplers are desired in the art. In particular, boom couplers which provide ease and efficiency of use would be advantageous.

BRIEF DESCRIPTION

Aspects and advantages of the invention in accordance with the present disclosure will be set forth in part in the following description, or may be obvious from the description, or may be learned through practice of the technology.

In accordance with one embodiment, a tool is provided. The tool includes a housing; a working head; and an elongated member extending between and coupling together the housing and the working head, wherein the elongated member comprises: a first elongated member coupled to the housing, the first elongated member including one of a latch or engagement surface; and a second elongated member coupled to the working head, the second elongated member including the other of the latch or engagement surface, wherein the first and second elongated members are pivotally coupled together about a pivot axis, and wherein the latch is configured to selectively interface with the engagement surface to lock the first and second elongated members in an in-use configuration.

In accordance with another embodiment, a boom coupler for a power tool is provided. The boom coupler includes a first connector comprising: a body having a tapered end; a flange extending radially from the body and including a first pivot location; and an engagement surface; a second connector comprising: a body having a complementary tapered end to interface with the tapered end of the body of the first connector; a flange extending radially from the body and including a second pivot location configured to coaxially align with the first pivot location to form a pivot axis between the first and second connectors; and a latch rotatably coupled to the body and configured to selectively interface with the engagement surface of the first connector to lock the first and second connectors in an in-use configuration.

In accordance with another embodiment, a method of reconfiguring a tool to an in-use configuration is provided. The method includes pivoting a first connector and a second connector relative to one another about a pivot axis, wherein the first connector is coupled to a first elongated member of the tool and the second connector is coupled to a second elongated member of the tool, and wherein pivoting the first and second connectors relative to one another causes a longitudinal axis of the first elongated member to be coaxial with a longitudinal axis of the second elongated members; and with the longitudinal axis of the first and second elongated members coaxial with one another, repositioning a latch from an unlocked position to a locked position, wherein repositioning the latch comprises rotating the latch about a pivot axis orthogonally oriented with respect to the longitudinal axis of the first and second elongated members.

These and other features, aspects and advantages of the present invention will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present invention, including the best mode of making and using the present systems and methods, directed to one of ordinary skill in the art, is set forth in the specification, which makes reference to the appended figures, in which.

DETAILED DESCRIPTION

Figure 1:
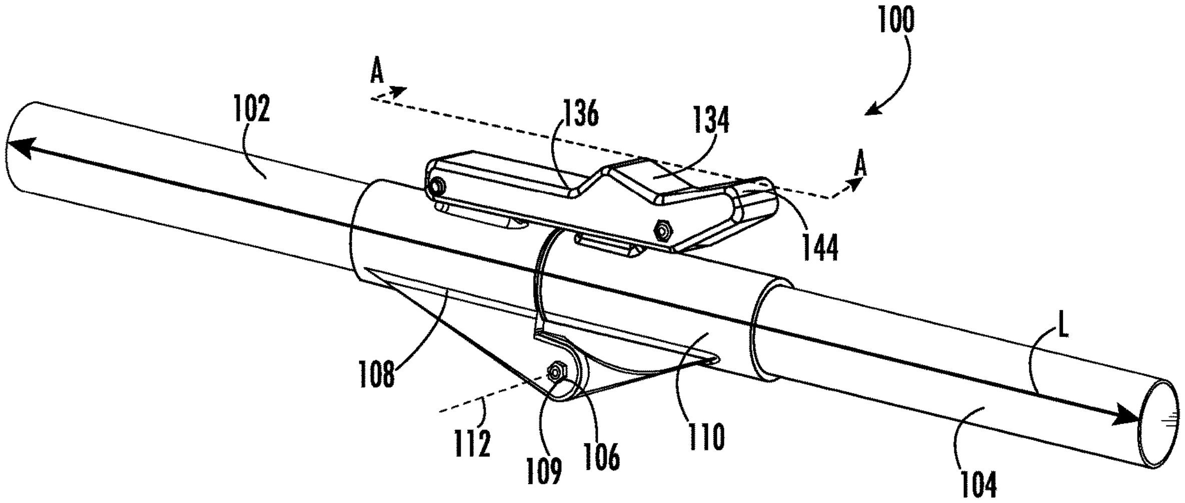
FIG. 1 is a perspective view of a boom coupler for a tool in accordance with embodiments of the present disclosure.

Reference now will be made in detail to embodiments of the present invention, one or more examples of which are illustrated in the drawings. The word "exemplary" is used herein to mean "serving as an example, instance, or illustration." Any implementation described herein as "exemplary" is not necessarily to be construed as preferred or advantageous over other implementations. Moreover, each example is provided by way of explanation, rather than limitation of, the technology. In fact, it will be apparent to those skilled in the art that modifications and variations can be made in the present technology without departing from the scope or spirit of the claimed technology. For instance, features illustrated or described as part of one embodiment can be used with another embodiment to yield a still further embodiment. Thus, it is intended that the present disclosure covers such modifications and variations as come within the scope of the appended claims and their equivalents.

As used herein, the terms "first", "second", and "third" may be used interchangeably to distinguish one component from another and are not intended to signify location or importance of the individual components. The singular forms "a," "an," and "the" include plural references unless the context clearly dictates otherwise. The terms "coupled," "fixed," "attached to," and the like refer to both direct coupling, fixing, or attaching, as well as indirect coupling, fixing, or attaching through one or more intermediate components or features, unless otherwise specified herein. As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive—or and not to an exclusive—or. For example, a condition A or B is satisfied by any one of the following: A is true (or present) and B is false (or not present), A is false (or not present) and B is true (or present), and both A and B are true (or present).

Approximating language, as used herein throughout the specification and claims, is applied to modify any quantitative representation that could permissibly vary without resulting in a change in the basic function to which it is related. Accordingly, a value modified by a term or terms, such as "about," "generally," "approximately," and "substantially," are not to be limited to the precise value specified. In at least some instances, the approximating language may correspond to the precision of an instrument for measuring the value, or the precision of the methods or machines for constructing or manufacturing the components or systems. For example, the approximating language may refer to being within a ±10 percent margin. When used in the context of an angle or direction, such terms include within ten degrees greater or less than the stated angle or direction. For example, "generally vertical" includes directions within ten degrees of vertical in any direction, e.g., clockwise or counter-clockwise.

Benefits, other advantages, and solutions to problems are described below with regard to specific embodiments. However, the benefits, advantages, solutions to problems, and any feature(s) that may cause any benefit, advantage, or solution to occur or become more pronounced are not to be construed as a critical, required, or essential feature of any or all the claims.

Tools allow a user to more efficiently perform tasks, such as lawn maintenance. Power tools rely on driven working elements to further enhance efficiency. Several types of tools (including some power tools) utilize elongated members, sometimes referred to as booms, to position the working element at a desired location relative to a workspace without requiring the user to bend or contort their body. One example of such tool is a string trimmer String trimmers generally include booms extending between a housing and a working head. The boom may have an adjustable length or a fixed length in the in-use configuration, i.e., when the working head is actively being driven. In use, the user can hold the housing and/or the boom to maneuver the working head over a ground surface.

In general, embodiments in accordance with the present disclosure are directed to a boom coupler configured to allow two or more objects, such as two or more elongated members that together form a boom, to be coupled together and selectively moved between an in-use configuration and a stored configuration. In the in-use configuration, the two or more objects can be statically fixed together in an in-use state. In the in-use state, the tool can be used to perform an operation, such as a cutting or a trimming operation. In the stored configuration, the two or more objects are collapsed relative to one another. In this regard, the collective size and shape of the two or more objects is different in the stored configuration than the in-use configuration to allow for easier storage and shipping of the two or more objects. In particular, the boom coupler allows a length of the tool to be reduced in the stored configuration, thereby reducing space requirements and costs associated with storage and shipping.

Figure 9:
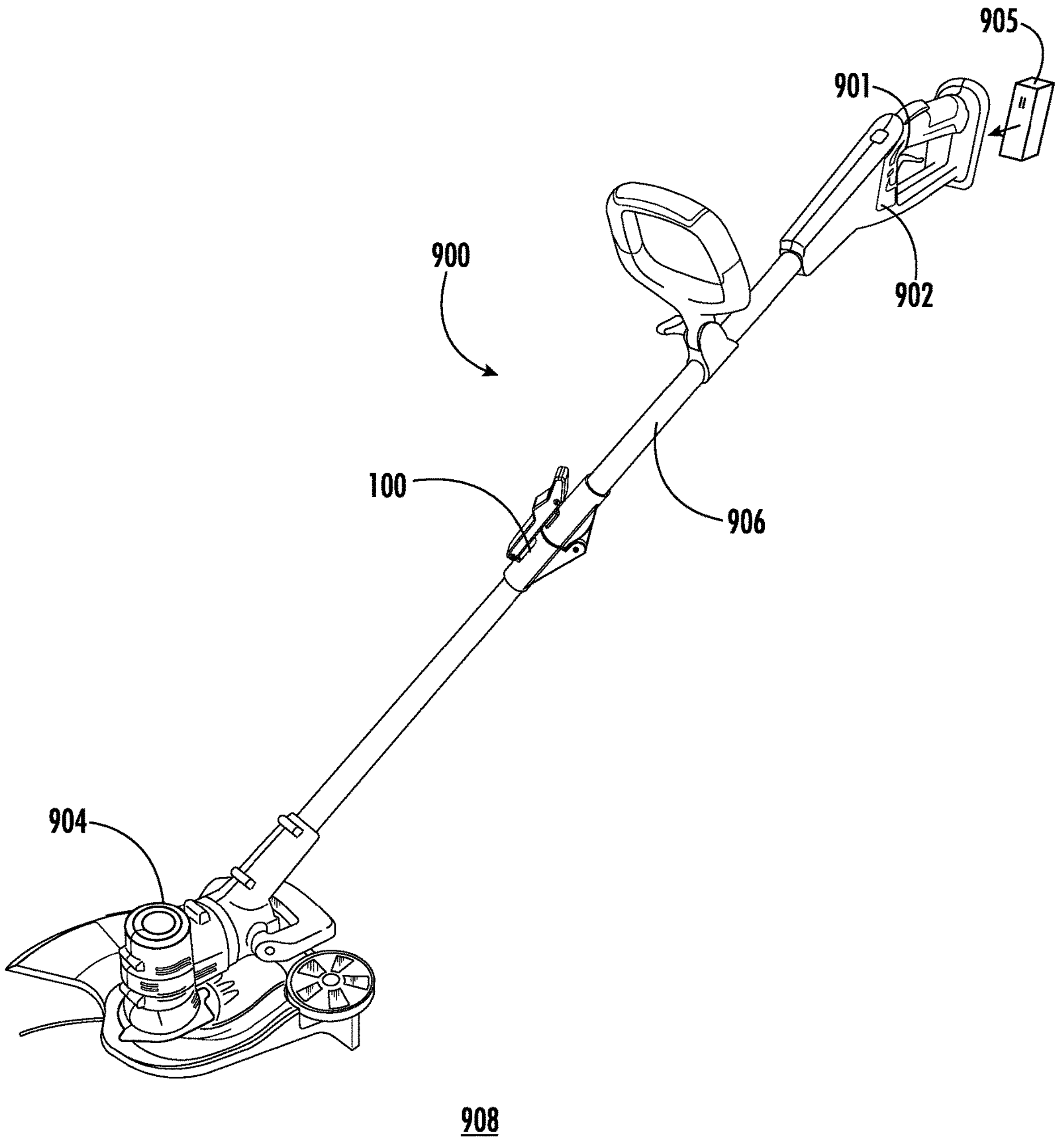
FIG. 9 is a perspective view of an example power tool using the boom coupler, in this case a powered string trimmer and edger combination, in accordance with embodiments of the present disclosure.

Referring initially to FIG. 9, in an embodiment the tool includes a string trimmer 900 (or a string trimmer/edger combination) including a housing 902 and a working head 904 spaced apart from one another by an elongated member 906. The housing 902 can include one or more user actuatable features, such as a trigger 901 that allows the user to selectively activate the working head 904 to control a speed of a string or cutting tool. The housing 902 can also interface with one or more batteries 905 that provide power to the working head 904. Power can be transferred to the working head 904 from the battery(ies) 905 by way of a cable that extends through a hollow core of the elongated member 906. In certain instances, the elongated member 906 may be at least 3 feet, such as at least 4 feet, such as at least 5 feet when the string trimmer 900 is in use to allow the user to operate the string trimmer 900 from a standing position while affecting a state of an underlying ground surface 908. When the user is finished with a trimming operation, the elongated member 906 can be collapsed (i.e., moved to the stored configuration using a boom coupler 100 described below) such that the string trimmer 900 is more easily stored. To perform additional operations, the user moves the elongated member 906 from the stored configuration back to the in-use configuration. The elongated member 906 can be locked in the in-use configuration by a latch as described herein. This process can be repeated between successive uses of the string trimmer 900.

FIG. 1 illustrates a boom coupler 100 in accordance with an example embodiment of the present disclosure. The boom coupler 100 generally includes a first member 102 and a second member 104 joined together at a moveable interface 106. In an embodiment, the moveable interface 106 is defined by a first connector 108 coupled with the first member 102 and a second connector 110 coupled with the second member 104. In an embodiment, an end of the first member 102 can be inserted into the first connector 108 and an end of the second member 104 can be inserted into the second connector 110. The first and second members 102 and 104 can be retained at the first and second connectors 108 and 110, respectively, by an adhesive, a press fit, a threaded engagement, a bayonet connection, via a heat shrink or clamp, using one or more threaded or non-threaded fasteners, other suitable connection means, or any combination thereof.

The first and second connectors 108 and 110 can be joined together at the moveable interface 106 such that the first and second connectors 108 and 110 can rotate with respect to one another about a pivot axis 112. For instance, the first and second connectors 108 and 110 can define openings that are coaxially aligned with one another and which together receive a pin 109 to form the pivot axis 112. The first and second connectors 108 and 110 can rotate about the pin 109 to allow the tool connected therewith to transition between an in-use configuration and a stored configuration. The first member 102 and second member 104 can be repositioned between the in-use and stored configurations by angularly displacing either/both of the first or second members 102 or 104 about the pivot axis 112.

Each of the first and second members 102 and 104 can be coupled with a different portion of a tool. For example, the boom coupler 100 can be used on the string trimmer 900 depicted in FIG. 9 (or another type of tool, such as a pole hedge trimmer, a stick edger, a pole lopper, a pole saw, electric snow shovels, electric cultivators, or the like). The first member 102 can be coupled with a working head of the tool (e.g., a string trimmer head, a saw head, a lopper head, etc.) and the second member 104 can be coupled with a housing of the tool (e.g., a portion of the tool having a handle, a user controller such as a trigger, a battery interface, etc.). This arrangement may be switched (inverted) such that the first member 102 is coupled with the housing and the second member 104 is coupled with the working head. While distal ends of the first and second members 102 and 104 are depicted in FIG. 1 as terminating at open ends, it should be understood that the first and second members 102 and 104 may be integral with the objects to which they attach at longitudinal ends of the boom coupler 100. For instance, the first member 102 may be integral with the working head of the tool, or attached with the working head of the tool.

Figure 2:
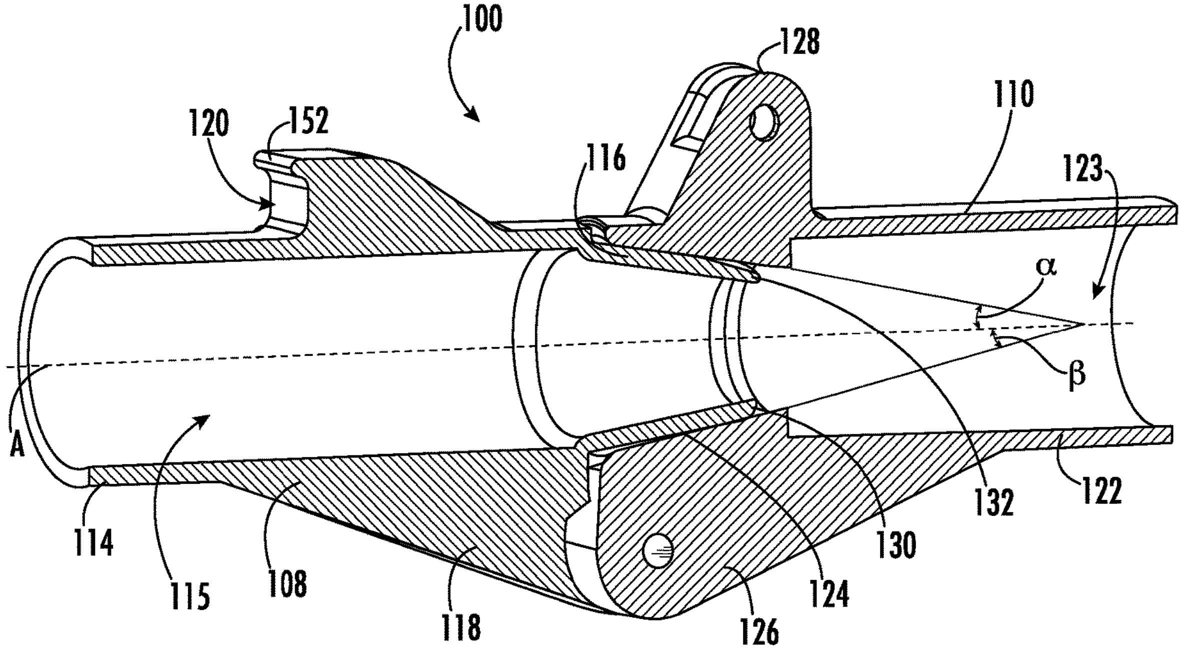
FIG. 2 is a cross-sectional view of the boom coupler as seen along Line A-A in FIG. 1 in accordance with embodiments of the present disclosure.

FIG. 2 illustrates a cross-sectional view of a portion of the boom coupler 100 as seen along Line A-A in FIG. 1. In particular, FIG. 2 illustrates a cross-sectional view of the first and second connectors 108 and 110 interfacing with one another with the boom coupler 100 arranged in the in-use configuration.

In an embodiment, the first connector 108 includes a body 114, a tapered end 116 extending axially from the body 114, a flange 118 extending radially from the body 114, and an engagement surface 120 extending radially from the body 114. The engagement surface 120 can be disposed opposite the flange 118. For example, the body 114 can define a longitudinal axis A and the engagement surface 120 and the flange 118 can be disposed on opposite sides of the longitudinal axis, such as 180° apart from one another. The body 114 and tapered end 116 can define an internal channel 115 extending therethrough. In an embodiment, the channel 115 can extend continuously between opposite axial ends of the first connector 108. The second connector 110 can similarly include a body 122, a tapered end 124 (which may be referred to as a complementary tapered end) extending axially from the body 122, a flange 126 extending radially from the body 122, and a latch engagement mechanism 128 extending radially from the body 122. The latch engagement mechanism 128 can be disposed opposite the flange 126. The body 122 and the tapered end 124 can define an internal channel 123 extending therethrough. In an embodiment, the channel 123 can extend continuously between opposite axial ends of the second connector 110.

In an embodiment, the tapered end 116 of the first connector 108 can extend into the tapered end 124 of the second connector 110. In certain instances, the tapered end 116 of the first connector 108 can seat within the tapered end 124 of the second connector 110 to form a fluid-tight, or substantially fluid-tight, seal therewith. As used herein, "fluid-tight" refers to a condition whereby fluid, such as gas or liquid, cannot escape when moving between channels 115 and 123. The term "substantially fluid-tight" refers to a condition whereby substantially all (e.g., at least 90%) of the fluid, such as gas or liquid, does not escape when moving between channels 115 and 123. In an embodiment, the seal may be formed at least in part by a discrete seal body installed around the tapered end 116, within the tapered end 124, or both. In another embodiment, the seal may be formed by the tapered ends 116 and 124 themselves, e.g., by a close fit arrangement with respect to one another. It should be understood that in yet other embodiments, the boom coupler 100 is utilized with tools which do not require a sealed interface between the tapered ends 116 and 124. For example, line trimmers having boom couplers 100 may not require fluid tight or substantially fluid tight sealed interfaces where the first and second connectors 108 and 110 join together in the in-use configuration. In such embodiments, surfaces of the tapered ends 116 and 124 may rest against (on) one another to form a fluid-resistant interface and/or be spaced apart from one another.

In an embodiment, the tapered end 116 of the first connector 108 can have a taper angle $\alpha$, as measured with respect to the longitudinal axis A, within a range between 0.5° and 15° (e.g., less than 15°), such as in a range between 1° and 10°, such as in a range between 5° and 9°, such as in a range of 6.5° and 8.5°. The tapered end 124 of the second connector 110 can have a taper angle $\beta$, as measured with respect to the longitudinal axis A, within a range between 0.5° and 15° (e.g., less than 15°), such as in a range between 1° and 10°, such as in a range between 5° and 9°, such as in a range of 6.5° and 8.5°. In an embodiment, $\alpha$ is equal to, or approximately equal to, $\beta$. Taper angles $\alpha$ and $\beta$ less than approximately 7° may be self-locking whereby the first and second connectors 108 and 110 are laterally and torsionally coupled together through frictional interfacing between surfaces of the tapered ends 116 and 124. Taper angles $\alpha$ and $\beta$ greater than approximately 7° may not fully self-lock and may allow for easier separation of the first and second connectors 108 and 110 from one another, e.g., to allow for reconfiguration of the boom coupler 100 as described herein. In an embodiment, the taper angles $\alpha$ and $\beta$ may be in a range between 7° and 12°, such as in a range between 7.5° and 9°. In a particular embodiment, the taper angles α and β may be approximately 8°.

In an embodiment, a leading edge 130 of the tapered end 116 can have a guide surface 132 configured to allow for guiding of the tapered end 116 of the first connector 108 into the tapered end 124 of the second connector 110. By way of non-limiting example, the guide surface 132 can include a steeper tapered surface, a rounded leading edge 130, or another arrangement which prevents binding when the tapered end 116 is introduced into the tapered end 124 and/or removed therefrom. In an embodiment, the guide surface 132 can extend around an entire circumference of the tapered end 116. In certain instances, the guide surface 132 can have a uniform profile around the entire circumference of the tapered end 116. In other instances, the guide surface 132 can have a variable profile around the circumference of the tapered end 116, such that the guide surface 132 has a first cross-sectional profile at a first location and a second cross-sectional profile different from the first profile at a second location. In yet another embodiment, the guide surface 132 may extend around only a portion of the circumference of the tapered end 116. The guide surface 132 can allow the first and second connectors 108 and 110 to interface with one another without binding when the first and second connectors 108 and 110 are rotatably joined together.

Figure 3:
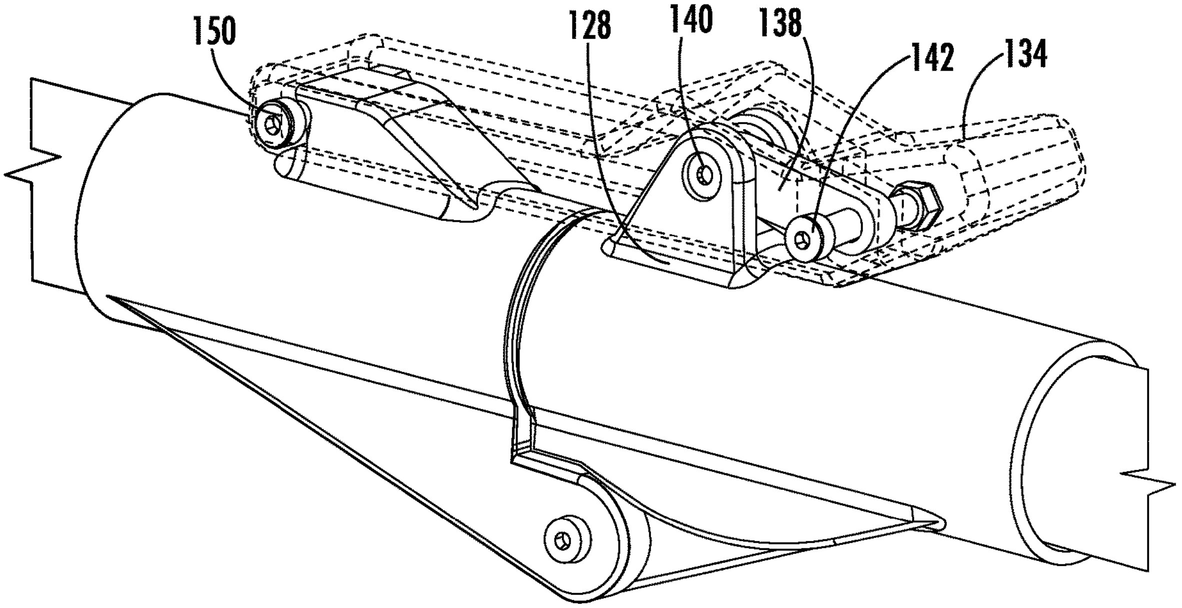
FIG. 3 is a perspective view of the boom coupler with a latch of the boom coupler depicted in dashed lines in accordance with embodiments of the present disclosure.
Figure 6:
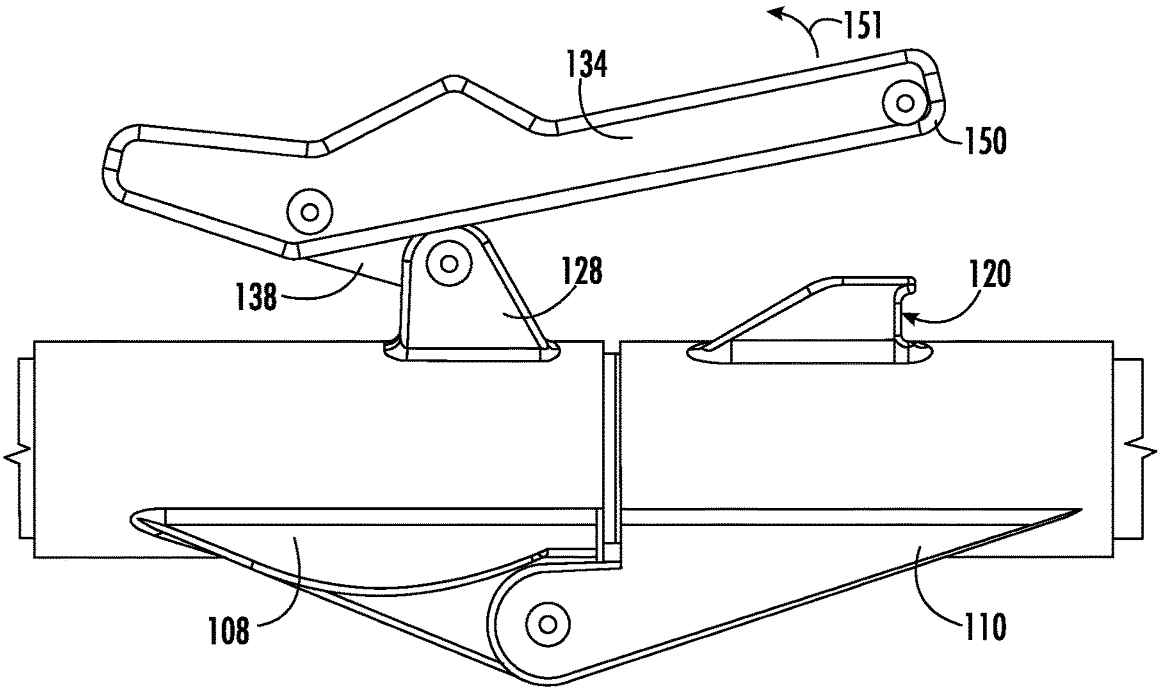
FIG. 6 is a side view of the boom coupler as seen with the latch in the unlocked position in accordance with embodiments of the present disclosure.

Referring again to FIG. 1, the boom connector 100 can further include a latch 134. The latch 134 can include a body 136 rotatably coupled to the latch engagement mechanism 128 (FIG. 2) of the second connector 110. As depicted in FIG. 3 and in accordance with an embodiment, the latch 134 may be indirectly coupled to the latch engagement mechanism 128, e.g., through an intermediary member 138 (which may be referred to as a dog bone connector). The intermediary member 138 can be rotatably coupled to the latch engagement mechanism 128, e.g., by a first pin 140. The intermediary member 138 can be rotatably coupled to the latch 134, e.g., by a second pin 142. The body 136 of the latch 134 can include an engageable portion 144 whereby an operator can engage the latch 134 to move the latch 134 from a locked position (as depicted in FIG. 3) to an unlocked position (as depicted in FIG. 6) or from the unlocked position (FIG. 6) to the locked position (FIG. 3). In an embodiment, the latch 134 can include an engagement member 150 configured to interface with the engagement surface 120 when the latch 134 is in the locked position.

Figure 4:
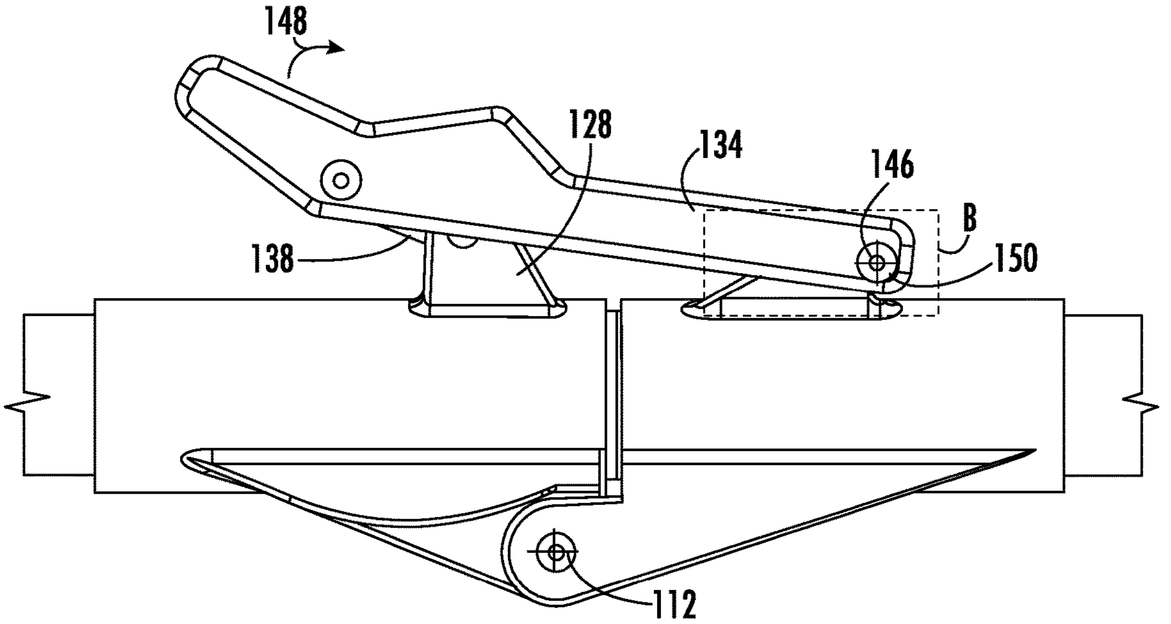
FIG. 4 is a side view of the boom coupler with the latch moved from a locked position towards an unlocked position in accordance with embodiments of the present disclosure.

FIG. 4 depicts a side view of the latch 134 as the latch 134 is initially moved from the locked position to the unlocked position by rotating the latch 134 in a direction shown by arrow 148. Initial movement of the latch 134 in the direction shown by arrow 148 may occur about, or substantially about, a rotational axis 146 as formed by the engagement member 150. Initial movement of the latch 134 may overcome a locking force created by the intermediary member 138 acting between the latch engagement mechanism 128 and the latch 134. In certain instances, during initial movement of the latch 134, the first and second couplers 108 and 110 may pivot about the pivot axis 112 (FIG. 1) towards one another to allow for the intermediary member 138 to overcome the locking force. The latch 134 can continue to move in the direction depicted by arrow 148 until the engagement member 150 (FIG. 5) of the latch 134 is uncoupled from the engagement surface 120.

Figure 5:
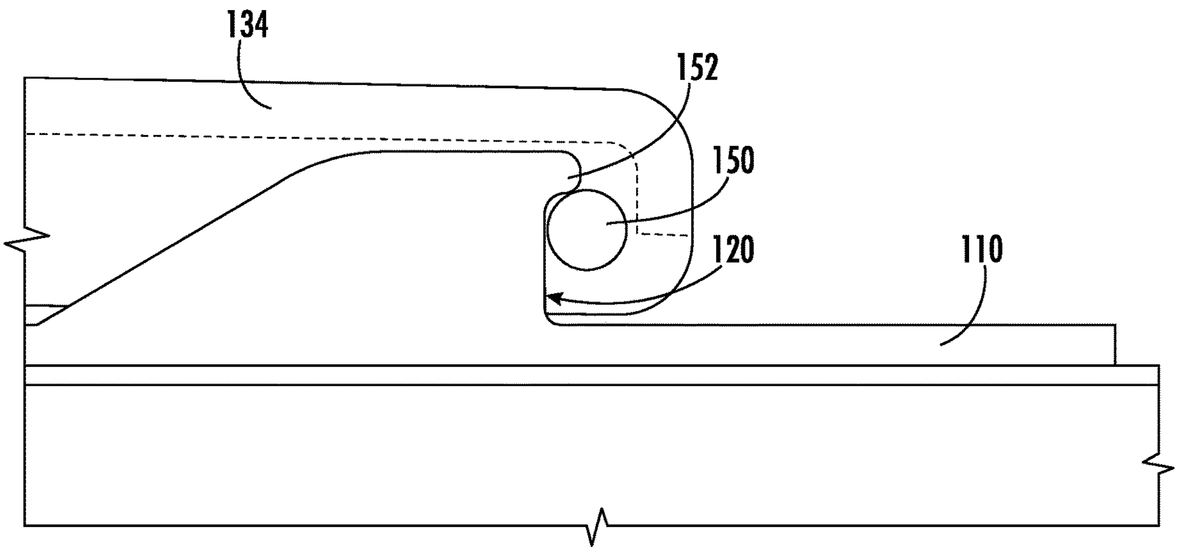
FIG. 5 is an enlarged side view of a portion of the latch as seen when the latch is in the locked position in accordance with embodiments of the present disclosure.

FIG. 5 illustrates a cross-sectional side view of the boom connector 100 as seen in Box B in FIG. 4. In an embodiment, the engagement surface 120 can generally include a surface against which the engagement member 150 of the latch 134 rests when the boom coupler 100 is in the in-use configuration. The engagement surface 120 can be planar, arcuate, stepped, or have features including planar, arcuate, or stepped portions. In an embodiment, the engagement surface 120 can be oriented generally perpendicular to an axial direction of the boom coupler 100, where the axial direction is generally parallel with a total length L (FIG. 1) of the first and second members 102 and 104. In an embodiment, the engagement surface 120 can be delimited by a stop 152. The stop 152 can be disposed at an end of the engagement surface 120. The stop 152 can extend outward from the engagement surface 120 a distance sufficient to prevent the engagement member 150 of the latch 134 from undesirably disengaging from the engagement surface 120 when the boom coupler 100 is in the in-use configuration. A transition between the engagement surface 120 and the stop 152 can be shaped to accommodate, e.g., closely fit, the engagement member 150. For instance, where the engagement member 150 comprises a pin coupled to the body 136 of the latch 134, the transition between the engagement surface 120 and the stop 152 can be arcuate to closely fit against the sidewall of the pin shaped engagement member 150. Other shapes and sizes of the transition are contemplated herein without deviating from the scope of the disclosure.

As the latch 134 continues to move in the direction depicted by arrow 148 in FIG. 4, the engagement member 150 can move in the axial direction and clear the stop 152 in the radial direction (where the radial direction is perpendicular to the axial direction) to allow for movement of the second connector 110 relative to the first connector 108. After the engagement member 150 clears the stop 152, the latch 134 can rotate from the engagement surface 120 to the unlocked position in a direction shown by arrow 151 in FIG. 6. As depicted, the latch 134 can move to the unlocked position by rotating relative to the intermediary member 138, the latch engagement mechanism 128, or both. In an embodiment, rotation of the latch 134 to the unlocked position after the engagement member 150 clears the stop 152 can occur through rotation of the latch 134 in a direction generally opposite of the initial rotation required to clear the stop 152.

Figure 7:
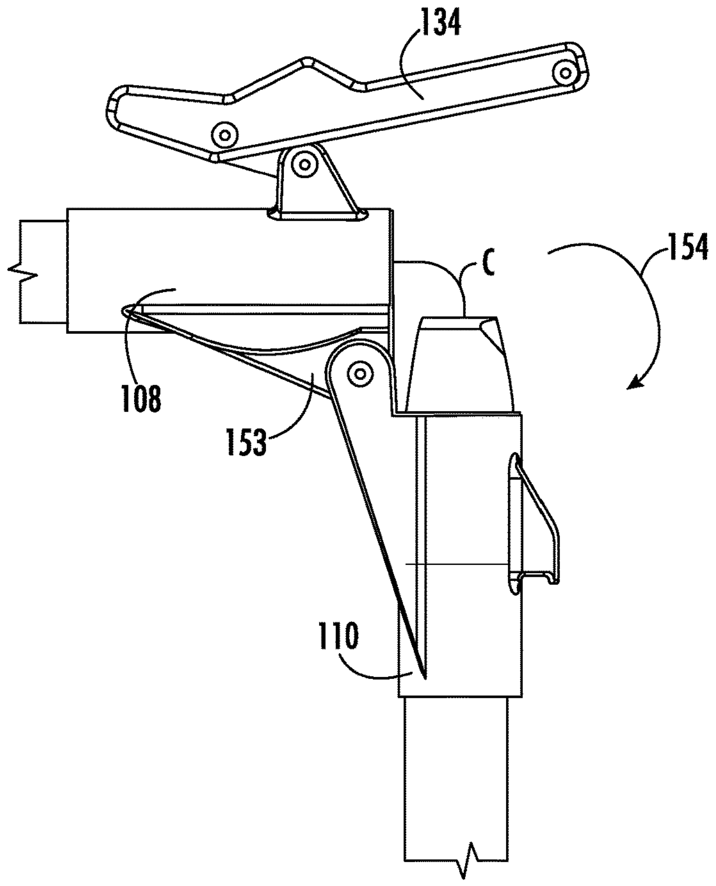
FIG. 7 is a side view of the boom coupler as seen with a first connector of the boom coupler rotated approximately 90° relative to a second connector of the boom coupler in accordance with embodiments of the present disclosure.
Figure 8:
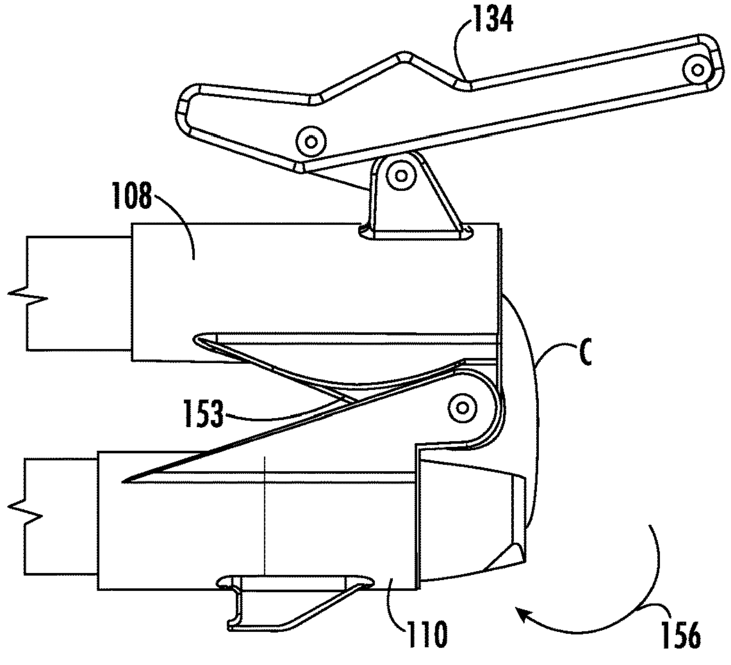
FIG. 8 is a side view of the boom coupler as seen with the first connector of the boom coupler rotated approximately 180° relative to the second connector of the boom coupler in accordance with embodiments of the present disclosure.

With the latch 134 in the unlocked position, the first and second connectors 108 and 110 can rotate relative to one another as shown in FIGS. 7 and 8. In certain instances, rotation of the second connector 110 can occur in the direction of arrows 154 and 156 over at least 90 degrees, such as over at least 100 degrees, such as over at least 110 degrees, such as over at least 120 degrees, such as over at least 130 degrees, such as over at least 140 degrees, such as over at least 150 degrees, such as over at least 160 degrees, such as over at least 170 degrees, such as over at least 180 degrees, such as over at least 190 degrees. In an embodiment, the second connector 110 can rotate approximately 180 degrees from the in-use configuration to the stored configuration as depicted in FIG. 8. In another embodiment, the second connector 110 can rotate greater than 180 degrees from the in-use configuration to the stored configuration.

The interface formed between the flange 118 of the first connector 108 and the flange 126 of the second connector 110 can include an accommodating feature, such as a groove or cutout 153, to allow the flanges 118 and 126 to rotate into the stored configuration. In the depicted embodiment, the groove or cutout 153 is disposed in the first connector 108 and allows the second connector 110 to move relative therewith without binding or jamming.

In certain instances, the boom coupler 100 can be maintained in the stored configuration by a locking mechanism (e.g., a tie wrapped around the first and second connectors 108 and 110 or the first and second members 102 and 104, or by another mechanism or method). The boom coupler 100 can be stored in the stored configuration with a reduced areal dimension, reducing the footprint or storage requirements for the boom coupler 100.

Referring again to FIG. 1, the boom coupler 100 can connect the first and second members 102 and 104 such that a total length L, as measured in the in-use configuration, between ends of the first and second members 102 and 104 is approximately twice the total length of the first and second members 102 and 104, such as measured in the stored configuration. That is, use of the boom coupler 100 can allow for reduction in length by approximately 50%. Without wishing to be bound by any specific theory, it is believed that length reduction in the stored configuration may allow for easier, more compact storage of a tool employing the boom connector 100, more manageable packaging and shipping in the stored configuration, and the like. In this regard, use of the boom coupler 100 can reduce cost of the tool by reducing costs associated with shipping and transport while reducing storage space needs and costs associated therewith.

The boom coupler 100 can be used in tools which require routing of mechanical cables, electrical and control wires, or the like through the boom coupler 100. For instance, referring to FIGS. 7 and 8, a cross-sectional side view of the boom coupler 100 is depicted showing a cable C extending through the hollow core of the first and second members 102 and 104, and passing through the channels 115 and 123 (FIG. 2) in the first and second connectors 108 and 110. When the boom coupler 100 is in the stored configuration, the cable C can extend out of the channels 115 and 123 of the first and second connectors 108 and 110 such that a portion of the cable C is exposed (e.g., visible) therefrom. To accommodate this external cable C in the stored configuration, the cable C can have a length that is greater than the length L between opposite ends of the first and second members 102 and 104. In this regard, the cable C can store slack within the boom connector 100 when the boom connector 100 is in the locked, in-use configuration. This slack can accommodate the extra length required of the cable C when the boom connector 100 is moved to the stored configuration.

When desired, the operator can return the boom coupler 100 to the in-use configuration by reversing the steps described above. For example, the operator can rotate the second connector 110 into axial alignment with the first connector 108 (as depicted in FIGS. 1 to 6) such that the longitudinal axis of the first and second connectors 108 and 110 are coaxial with one another. With the first and second connectors 108 and 110 aligned, the latch 134 can be moved into a position where the engagement member 150 is positioned at (e.g., along) the engagement surface 120. The latch 134 is then rotated in a direction opposite to the direction shown by arrow 148 in FIG. 4 until the boom connector 100 is locked. In certain instances, the boom coupler 100 can create a user indication, such as a tactile or audible indication, to signal to the user when the latch 134 reaches the locked position. For example, the latch 134 can snap into the locked position upon reaching a critical rotational position where the intermediary member 138 is parallel with the first connector 108. Immediately after reaching the critical rotational position, the intermediary member 138 can automatically continue to rotate to the locked position, resulting in a tactile and/or audible indication to the user. Conversely, the latch 134 can snap to the unlocked position upon reaching the critical rotational position when approached from the opposite direction. After reaching the critical rotational position, the intermediary member 138 can automatically continue to rotate to the unlocked position.

Figure 10:
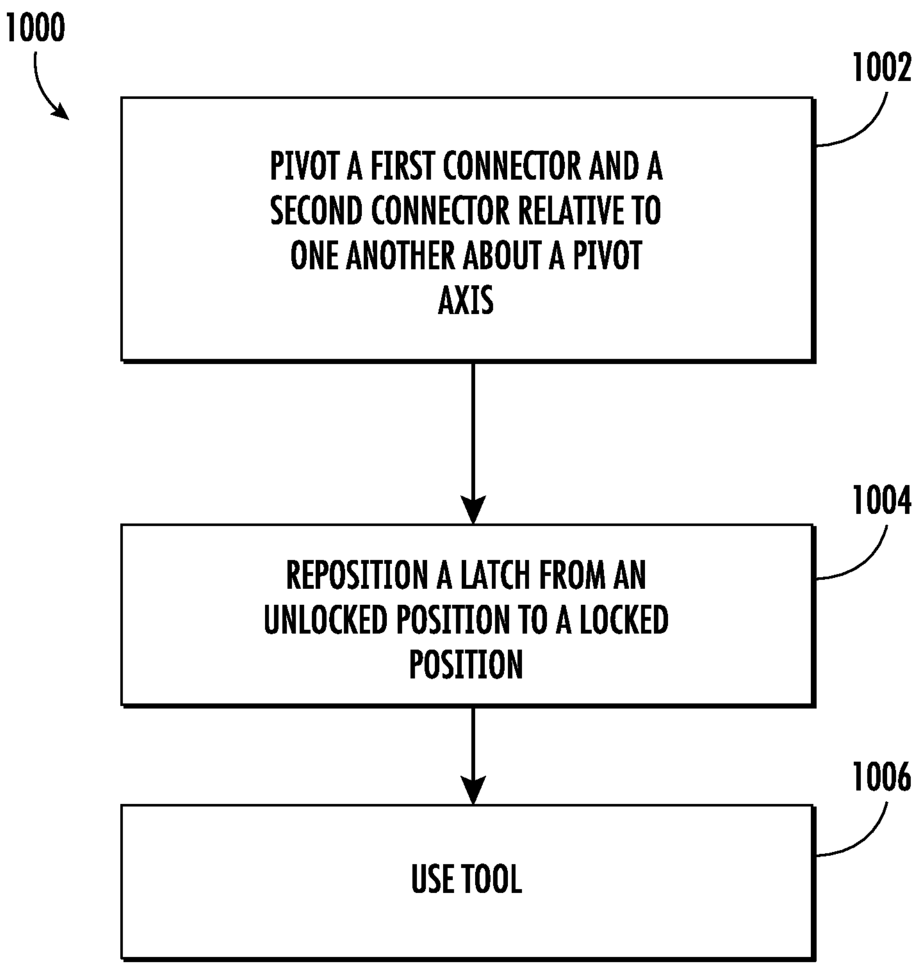
FIG. 10 is a flow chart of a method of reconfiguring a tool to an in-use configuration in accordance with embodiments of the present disclosure.

FIG. 10 illustrates a flowchart of a method 1000 of reconfiguring a tool to an in-use configuration, e.g., from the stored configuration, in accordance with an example embodiment. In general, the method 1000 will be described with reference to a tool including the boom coupler 100. In addition, although FIG. 10 depicts steps performed in a particular order for purposes of illustration and discussion, the method discussed herein is not limited to any particular order or arrangement. One skilled in the art, using the disclosure provided herein, will appreciate that various steps of the method disclosed herein can be omitted, rearranged, combined, and/or adapted in various ways without deviating from the scope of the present disclosure.

The method 1000 can include pivoting 1002 a first connector and a second connector relative to one another about a pivot axis. The first connector may be coupled to a first elongated member of the tool and the second connector can be coupled to a second elongated member of the tool. For instance, the first connector may be coupled to an end of the first elongated member and the second connector may be coupled to an end of the second elongated member. Pivoting 1002 the first connector relative to the second connector can be performed when a longitudinal axis of the first connector is angularly displaced from a longitudinal axis of the second connector. Pivoting the first and second connectors relative to one another can cause the longitudinal axis of the first elongated member to become coaxial with the longitudinal axis of the second elongated member. In an embodiment, pivoting 1002 the first connector and second connector relative to one another is performed by pivoting the first connector at least 120° relative to the second connector. That is, the longitudinal axis of the first and second connectors can be angularly offset by at least 120° prior to pivoting 1002 the first connector relative to the second connector. As the first and second connectors pivot, a tapered end of the first connector can extend into a complementary tapered end of the second connector. The tapered ends of the first and second connectors can come into contact with one another and form a frictional engagement therebetween that assists in preventing the first and second connectors from moving out of the in-use position.

The method 1000 further includes repositioning 1004 a latch from an unlocked position to a locked position. Repositioning 1004 the latch is performed with the longitudinal axis of the first and second elongated members oriented coaxial with respect to one another. Repositioning 1004 the latch can include rotating the latch about a pivot axis orthogonally oriented with respect to the longitudinal axis of the first and second elongated members. In an embodiment, the latch can snap into the locked position, generating a tactile and/or audible notification to the user that the boom coupler 100 is locked.

The method 1000 further includes using 1006 the tool with the boom coupler in the in-use position. Use 1006 of the tool can include performing a yard maintenance operation, such as a mowing operation, a trimming operation, an edging operation, a blowing operation, a raking operation, or the like. After use 1006, the tool can be returned to the stored configuration to reduce an aerial footprint of the tool for storage.

Boom couplers 100 described herein may be employed with various powered and non-powered tools. For example, the boom coupler 100 can be used with powered tools such as string trimmers, pole hedge trimmers, stick edgers, pole loppers, pole saws, electric snow shovels, electric cultivators, and the like. The boom coupler 100 can further be used as part of extension poles for use with, e.g., pruners, other types of saws, lights, work stands, and the like. In some instances, the elongated member to which the boom coupler 100 is used with can further include one or more additional features, such as a length adjuster (e.g., a rotatable collar that rotates to allow telescoping between two members), a handle, a second boom coupler, a shock dampening element, or the like.

Embodiment 1. A tool comprising: a housing; a working head; and an elongated member extending between and coupling together the housing and the working head, wherein the elongated member comprises: a first elongated member coupled to the housing, the first elongated member including one of a latch or engagement surface; and a second elongated member coupled to the working head, the second elongated member including the other of the latch or engagement surface, wherein the first and second elongated members are pivotally coupled together about a pivot axis, and wherein the latch is configured to selectively interface with the engagement surface to lock the first and second elongated members in an in-use configuration.

Embodiment 2. The tool of embodiment 1, wherein the first elongated member includes a first tapered end and the second elongated member includes a second tapered end, wherein the first tapered end has a taper angle less than 15°, and wherein the first tapered end fits within the second tapered end when the first and second elongated members are in the in-use configuration.

Embodiment 3. The tool of any one of embodiments 1 or 2, wherein the first and second elongated members together define a longitudinal axis in the in-use configuration, and wherein the engagement surface and the pivot axis are disposed on opposite sides of the longitudinal axis.

Embodiment 4. The tool of any one of embodiments 1 to 3, wherein the first and second elongated members are pivotable relative to one another about the pivot axis between the in-use configuration and a stored configuration, and wherein an angular displacement of the first and second elongated members, as measured between the in-use configuration and the stored configuration, is greater than 90°.

Embodiment 5. The tool of any one of embodiments 1 to 4, wherein the pivot axis is orthogonally oriented relative to a longitudinal axis of the first and second elongated members in the in-use configuration.

Embodiment 6. The tool of embodiment 5, wherein the latch is rotatable about an axis oriented parallel to the pivot axis.

Embodiment 7. The tool of any one of embodiments 1 to 6, wherein the tool further comprises a cable extending through a hollow core of the first and second elongated members between the housing and the working head, and wherein at least a portion of the cable is exposed when the first and second elongated members are in the stored configuration.

Embodiment 8. The tool of embodiment 7, wherein the cable has slack when the first and second elongated members are in the in-use configuration.

Embodiment 9. The tool of any one of embodiments 1 to 8, wherein the tool comprises a string trimmer Embodiment 10. A boom coupler for a power tool, the boom coupler comprising: a first connector comprising: a body having a tapered end; a flange extending radially from the body and including a first pivot location; and an engagement surface; a second connector comprising: a body having a complementary tapered end to interface with the tapered end of the body of the first connector; a flange extending radially from the body and including a second pivot location configured to coaxially align with the first pivot location to form a pivot axis between the first and second connectors; and a latch rotatably coupled to the body and configured to selectively interface with the engagement surface of the first connector to lock the first and second connectors in an in-use configuration.

Embodiment 11. The boom coupler of embodiment 10, wherein the body of the first connector comprises a hollow core, wherein the body of the second connector comprises a hollow core, and wherein the hollow cores of the first and second connectors are in communication with one another in the in-use configuration.

Embodiment 12. The boom coupler of embodiment 11, wherein the hollow core of the first connector is configured to receive a first elongated member, wherein the hollow core of the second connector is configured to receive a second elongated member, and wherein a cable is configured to extend through the hollow cores of the first and second members.

Embodiment 13. The boom coupler of any one of embodiments 10 to 12, wherein the first and second connectors together define a longitudinal axis in the in-use configuration, and wherein the engagement surface and the pivot axis are disposed on opposite sides of the longitudinal axis.

Embodiment 14. The boom coupler of any one of embodiments 10 to 13, wherein the latch is rotatable about an axis oriented parallel to the pivot axis.

Embodiment 15. The boom coupler of claim 10, wherein the first and second connectors are configured to rotate approximately 180° relative to one another about the pivot axis between the in-use configuration and a stored configuration.

Embodiment 16. A method of reconfiguring a tool to an in-use configuration, the method comprising: pivoting a first connector and a second connector relative to one another about a pivot axis, wherein the first connector is coupled to a first elongated member of the tool and the second connector is coupled to a second elongated member of the tool, and wherein pivoting the first and second connectors relative to one another causes a longitudinal axis of the first elongated member to be coaxial with a longitudinal axis of the second elongated members; and with the longitudinal axis of the first and second elongated members coaxial with one another, repositioning a latch from an unlocked position to a locked position, wherein repositioning the latch comprises rotating the latch about a pivot axis orthogonally oriented with respect to the longitudinal axis of the first and second elongated members.

Embodiment 17. The method of embodiment 16, wherein repositioning the latch to the locked position generates a tactile indication to the operator that the latch is in the locked position.

Embodiment 18. The method of any one of embodiments 16 or 17, wherein pivoting the first and second connectors relative to one another is performed by pivoting the first connector at least 90° relative to the second connector.

Embodiment 19. The method of any one of embodiments 16 to 18, wherein pivoting the first and second connectors relative to one another causes a tapered end of the first connector to extend into a complementary tapered end of the second connector.

Embodiment 20. The method of embodiment 19, wherein the tapered end of the first connector and the complementary tapered end of the second connector are in contact with one another upon repositioning the latch to the locked position This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A tool comprising:

a housing;

a working head; and an elongated member assembly extending between and coupling together the housing and the working head, wherein the elongated member assembly is reconfigurable between an in-use configuration and a stored configuration, wherein the elongated member assembly defines a longitudinal axis in an in-use configuration, wherein the elongated member assembly comprises:

a first elongated member coupled to the housing, the first elongated member including a first connector having one of a latch or an engagement surface and a first tapered end; and a second elongated member coupled to the working head, the second elongated member including a second connector having the other of the latch or the engagement surface and a second tapered end, wherein the first and second connectors are pivotally coupled together about a pivot axis oriented perpendicular to and spaced radially apart from the longitudinal axis, and wherein the first tapered end is configured to fit within the second tapered end to form a seated interface along the longitudinal axis when the latch is engaged with the engagement surface to lock the first and second elongated members in the in-use configuration.

2. The tool of claim 1, wherein the first tapered end has a taper angle less than 15°.

3. The tool of claim 1, wherein the engagement surface and the pivot axis are disposed on opposite sides of the longitudinal axis.

4. The tool of claim 1, wherein an angular displacement of the first and second elongated members, as measured between the in-use configuration and the stored configuration, is greater than 120°.

5. The tool of claim 4, wherein each of the first and second elongated members comprises a hollow core, wherein the tool further comprises a cable extending through the hollow core of the first and second elongated members between the housing and the working head, and wherein at least a portion of the cable is exposed when the first and second elongated members are in the stored configuration.

6. The tool of claim 5, wherein the cable is slack when the first and second elongated members are in the in-use configuration.

7. The tool of claim 1, wherein the latch is rotatable about an axis oriented parallel to the pivot axis.

8. The tool of claim 1, wherein the latch is coupled to the first or second elongated member through an intermediary member, and wherein the latch is configured to generate a tactile indication in response to the latch reaching a locked position.

9. The tool of claim 1, wherein the tool comprises a string trimmer.

10. A boom coupler for a power tool, the boom coupler comprising:

a first connector comprising:

a body having a male tapered end extending axially therefrom;

a flange extending radially from the body and including a first pivot location; and an engagement surface;

a second connector comprising:

a body having a female complementary tapered end defining a tapered internal socket to interface with the male tapered end of the body of the first connector when the boom coupler is in an in-use configuration, wherein the male tapered end is configured to be received within the tapered internal socket along a longitudinal axis of the first and second connectors to form a seated frictional interface when in the in-use configuration;

a flange extending radially from the body and including a second pivot location configured to coaxially align with the first pivot location to form a pivot axis between the first and second connectors; and a latch rotatably coupled to the body and configured to selectively interface with the engagement surface of the first connector to lock the first and second connectors in the in-use configuration.

11. The boom coupler of claim 10, wherein the body of the first connector comprises a hollow core, wherein the body of the second connector comprises a hollow core, and wherein the hollow cores of the first and second connectors are in communication with one another in the in-use configuration.

12. The boom coupler of claim 11, wherein the hollow core of the first connector is configured to receive a first elongated member, wherein the hollow core of the second connector is configured to receive a second elongated member, and wherein a cable is configured to extend through the body of the first connector and the body of the second connector.

13. The boom coupler of claim 10, wherein the first and second connectors together define the longitudinal axis in the in-use configuration, and wherein the engagement surface and the pivot axis are disposed on opposite sides of the longitudinal axis.

14. The boom coupler of claim 10, wherein the latch is rotatable about an axis oriented parallel to the pivot axis.

15. The boom coupler of claim 10, wherein the first and second connectors are configured to rotate approximately 180° relative to one another about the pivot axis between the in-use configuration and a stored configuration.

16. A method of reconfiguring a tool to an in-use configuration, the method comprising:

pivoting a first connector and a second connector relative to one another about a pivot axis, wherein the first connector is coupled to a first elongated member of the tool and the second connector is coupled to a second elongated member of the tool, and wherein pivoting the first and second connectors relative to one another causes a longitudinal axis of the first elongated member to be coaxial with a longitudinal axis of the second elongated member and further causes a male tapered end of the first connector to enter a female tapered socket of the second connector along the longitudinal axis; and with the longitudinal axis of the first and second elongated members oriented coaxial with respect to one another, repositioning a latch from an unlocked position to a locked position, wherein repositioning the latch comprises rotating the latch about a pivot axis orthogonally oriented with respect to the longitudinal axis of the first and second elongated members to urge the male tapered end into frictional engagement with the female tapered socket.

17. The method of claim 16, wherein repositioning the latch to the locked position generates a tactile indication to a user that the latch is in the locked position.

18. The method of claim 16, wherein pivoting the first and second connectors relative to one another is performed by pivoting the first connector at least 120° relative to the second connector.

19. The method of claim 16, wherein the pivot axis is disposed on a radial flange.

20. The method of claim 19, wherein the tapered end of the first connector and the tapered end of the second connector are in contact with one another upon repositioning the latch to the locked position.

* * * * *